United States Patent
Nashizawa

(10) Patent No.: US 10,600,165 B2
(45) Date of Patent: Mar. 24, 2020

(54) IMAGE PROCESSING APPARATUS CAPABLE OF PERFORMING TONE CONVERSION WITH A VISUALLY EQUIVALENT LUMINANCE CHANGE, IMAGE PROCESSING METHOD, AND STORAGE MEDIUM

(71) Applicant: CANON KABUSHIKI KAISHA, Tokyo (JP)

(72) Inventor: Hiroaki Nashizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/152,626

(22) Filed: Oct. 5, 2018

(65) Prior Publication Data
US 2019/0108626 A1    Apr. 11, 2019

(30) Foreign Application Priority Data
Oct. 10, 2017    (JP) .................................. 2017-197060

(51) Int. Cl.
| | |
|---|---|
| *G06T 5/00* | (2006.01) |
| *H04N 5/235* | (2006.01) |
| *H04N 9/73* | (2006.01) |
| *H04N 9/04* | (2006.01) |
| *H04N 9/69* | (2006.01) |

(Continued)

(52) U.S. Cl.
CPC ............. *G06T 5/009* (2013.01); *H04N 5/232* (2013.01); *H04N 5/2353* (2013.01); *H04N 5/2355* (2013.01); *H04N 9/045* (2013.01); *H04N 9/0451* (2018.08); *H04N 9/69* (2013.01); *H04N 9/73* (2013.01); *H04N 9/77* (2013.01); *G06T 2207/20208* (2013.01); *H04N 5/2351* (2013.01); *H04N 9/735* (2013.01)

(58) Field of Classification Search
None
See application file for complete search history.

(56) References Cited

U.S. PATENT DOCUMENTS

| | | | |
|---|---|---|---|
| 6,868,189 B1 * | 3/2005 | Hoshino ............... | H04N 1/6011 |
| | | | 382/260 |
| 9,992,426 B2 * | 6/2018 | Hisa ..................... | H04N 5/2355 |
| 10,296,807 B2 * | 5/2019 | Takahashi ............ | H04N 5/2351 |

(Continued)

FOREIGN PATENT DOCUMENTS

| | | |
|---|---|---|
| JP | 2001-027890 A | 1/2001 |
| JP | 2015-156616 A | 8/2015 |

(Continued)

*Primary Examiner* — Cynthia Segura
(74) *Attorney, Agent, or Firm* — Cowan, Liebowitz & Latman, P.C.

(57) ABSTRACT

An image processing apparatus operable to perform development processing by performing at least a tone conversion on RAW image data that is inputted image data, the image processing apparatus comprising: a setting unit configured to set a first tone conversion curve corresponding to a dynamic range of the image data; an adjusting unit configured to generate a second tone conversion curve by adjusting the first tone conversion curve so that luminance changes of a bright portion and a dark portion of the image data are visually equivalent; and a tone conversion unit configured to perform a tone conversion of the image data by using the second tone conversion curve.

12 Claims, 14 Drawing Sheets

(51) Int. Cl.
*H04N 9/77* (2006.01)
*H04N 5/232* (2006.01)

(56) References Cited

U.S. PATENT DOCUMENTS

| | | | |
|---|---|---|---|
| 2013/0321671 A1* | 12/2013 | Cote | H04N 5/365 348/241 |
| 2013/0322753 A1* | 12/2013 | Lim | G06T 5/001 382/167 |
| 2015/0109525 A1* | 4/2015 | Kimura | H04N 5/20 348/370 |
| 2016/0037046 A1* | 2/2016 | Nashizawa | H04N 5/2355 348/229.1 |
| 2017/0116963 A1* | 4/2017 | Wanat | G09G 5/10 |
| 2018/0007356 A1* | 1/2018 | Kadu | G06T 5/008 |
| 2018/0075588 A1* | 3/2018 | Hosoda | G06T 5/008 |
| 2018/0096220 A1* | 4/2018 | Takahashi | H04N 5/2351 |
| 2019/0019277 A1* | 1/2019 | Chen | G06T 5/009 |
| 2019/0052790 A1* | 2/2019 | Kang | H04N 5/232935 |
| 2019/0158793 A1* | 5/2019 | Oh | H04N 9/68 |
| 2019/0279549 A1* | 9/2019 | Shin | G09G 3/2007 |

FOREIGN PATENT DOCUMENTS

| | | | | |
|---|---|---|---|---|
| JP | 2016-086347 A | 5/2016 | | |
| WO | WO-2014130343 A2 * | 8/2014 | | H04N 5/20 |

* cited by examiner

IMAGE PROCESSING APPARATUS CAPABLE OF PERFORMING TONE CONVERSION WITH A VISUALLY EQUIVALENT LUMINANCE CHANGE, IMAGE PROCESSING METHOD, AND STORAGE MEDIUM

BACKGROUND OF THE INVENTION

Field of the Invention

The present invention relates to a technique for developing an HDR (high dynamic range) image.

Description of the Related Art

Due to, for example, progress in LED elements for displays in recent years, it is possible to have blacker blacks and higher luminances, and it is possible to display data for a high dynamic range (hereinafter referred to as HDR) image unchanged without compressing it. With HDR, it is possible to realistically reproduce scenery such as the neon of a night scene or the tones of clouds in a blue sky for which contrast is poor with a conventional dynamic range (hereinafter referred to as SDR (Standard Dynamic Range)).

However, HDR also has a characteristic where bright portions are glaringly bright, and a main object is perceived as being relatively dark. This is thought to be due to simultaneous contrast which occurs in cases of spatial adjacency, in color contrast which is a characteristic of visual perception for a human. In simultaneous contrast, there is brightness contrast as well as chroma contrast where the chroma of a color that is surrounded by a color having a high chroma appears reduced.

The aforementioned phenomenon of simultaneous contrast is one where a brightness/darkness difference is enhanced, and, while there are scenes where this is desirable for realistic HDR image quality, there are cases where a desirable image is not necessarily achieved if the brightness of a main object, in particularly a person's face or the like, has darkened. In such a case, it is envisioned that a user will perform an adjustment to lower the contrast by using an image quality adjustment function inside a camera at a time of capturing, or an image quality adjustment function inside a PC application at a time of development.

As a typical method for contrast adjustment, there is a common method for performing amplitude control that takes a signal level as a reference, and adjusts signals that are larger than this and signals that are smaller than this. However, with a human's vision characteristics, because a sensory amount is perceived as proportional to the logarithm of the intensity of a stimulus amount (a luminance value in this case), even if adjustment amounts for a dark portion and a bright portion with respect to a reference signal level are made to be the same amounts, the same amount of change will not be perceived for the dark portion and the bright portion. This phenomenon becomes more noticeable when a target luminance as handled with HDR is a high luminance that exceeds 1000 nits.

Accordingly, for example, Japanese Patent Laid-Open No. 2016-086347 proposes a correction method that maintains a contrast by compressing based on global luminance when the dynamic range of an output apparatus is smaller than the dynamic range of an image capturing apparatus. In addition, Japanese Patent Laid-Open No. 2001-027890 proposes a method for performing luminance adjustment of a backlight so that an average luminance level does not change visually, while keeping a correlation with a contrast adjustment performed by contrast adjustment means.

However, the foregoing conventional technique disclosed by Japanese Patent Laid-Open No. 2016-086347 is a method for maintaining contrast as much as possible while considering the characteristic of visual perception of a human, in a method of compressing a dynamic range from a wide state to a narrow state. However, this is not a method for guaranteeing that adjustment amounts for dark portions and bright portions will be perceived as equivalent amounts.

In addition, the conventional technique disclosed by Japanese Patent Laid-Open No. 2001-027890 is characterized by attempting to maintain an average luminance with consideration given to a luminance reproduction range of a backlight of a display apparatus, in addition to simple amplitude control of a signal. However, this is not a method for guaranteeing that adjustment amounts for dark portions and bright portions will be perceived as equivalent amounts.

SUMMARY OF THE INVENTION

The present invention is made in light of the problems described above, and provides an image processing apparatus that can adjust the contrast of an HDR image so that perceived amounts of change in brightness for a dark portion and a bright portion are equivalent.

According to a first aspect of the present invention, there is provided an image processing apparatus operable to perform development processing by performing at least a tone conversion on RAW image data that is inputted image data, the apparatus comprising: a setting unit configured to set a first tone conversion curve corresponding to a dynamic range of the image data; an adjusting unit configured to generate a second tone conversion curve by adjusting the first tone conversion curve so that luminance changes of a bright portion and a dark portion of the image data are visually equivalent; and a tone conversion unit configured to perform a tone conversion of the image data by using the second tone conversion curve.

According to a second aspect of the present invention, there is provided an image processing method for performing development processing by performing at least a tone conversion on RAW image data that is inputted image data, the method comprising: setting a first tone conversion curve corresponding to a dynamic range of the image data; generating a second tone conversion curve by adjusting the first tone conversion curve so that luminance changes of a bright portion and a dark portion of the image data are visually equivalent; and performing a tone conversion of the image data by using the second tone conversion curve.

Further features of the present invention will become apparent from the following description of exemplary embodiments with reference to the attached drawings.

DESCRIPTION OF THE EMBODIMENTS

Hereinafter, referring to the attached drawings, embodiments of the present invention will be described in detail. Note that, in the following embodiments, description is given regarding a digital camera as an example of an image processing apparatus of the present invention. Note that the present invention is not limited to a device whose main purpose is image capturing as with a digital camera, and can be applied to any device that incorporates or externally connects to an image capturing apparatus, such as a mobile telephone, a personal computer (laptop type, desktop type, tablet type, or the like), and a game device. Consequently, the term "image capturing apparatus" in the present specification is intended to comprise any electronic device provided with an image capturing function.

(First Embodiment)

Figure 1:
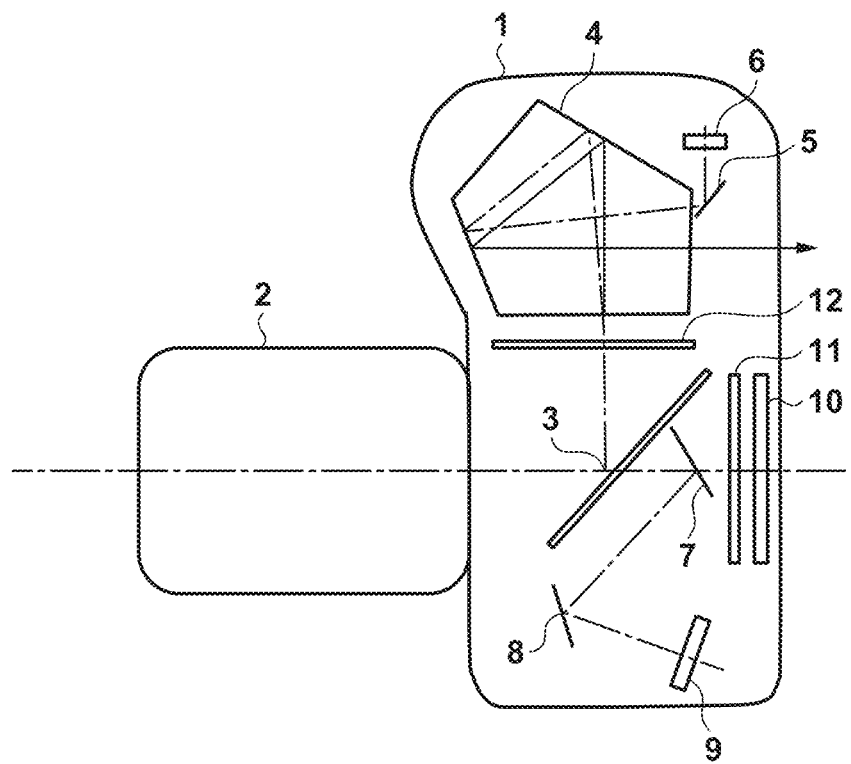
FIG. 1 is a cross-sectional view of a digital camera according to a first embodiment of the present invention.

FIG. 1 is a cross-sectional view that illustrates an arrangement, mainly of optical members, sensors, or the like, of a digital camera according to a first embodiment of the present invention. The digital camera in the present embodiment is a so-called digital single-lens reflex camera whose lens can be interchanged, and has a camera main body 1 and an interchangeable lens 2.

In the camera main body 1, an image capturing element 10 is a CMOS image sensor or a CCD image sensor, for example, and a plurality of pixels (charge-accumulation type photo-electric conversion elements) are arranged. A mechanical shutter 11, which is provided in front of the image capturing element 10, controls an exposure timing and exposure time for the image capturing element 10. A semi-transparent main mirror 3 and a first reflecting mirror 7 which is arranged on a back surface of the main mirror 3 spring upward at a time of capturing. A second reflecting mirror 8 reflects a light beam, which is reflected by the first reflecting mirror 7, to cause the light beam to be incident on a focus detection sensor (an AF sensor) 9. The focus detection sensor 9 is, for example, an image capturing element having a smaller number of pixels than the image capturing element 10. The first reflecting mirror 7, the second reflecting mirror 8, and the focus detection sensor 9 are a configuration for performing focus detection by a phase difference detection method at any position in a capturing screen.

A light metering sensor (an AE sensor) 6 receives an image of the capturing screen that is reflected by a pentagonal prism 4 and a third reflecting mirror 5. The AE sensor 6 divides a light-receiving portion into a plurality of regions, and it is possible to output luminance information for an object on a per-region basis. There is no limitation on the number of divisions.

Note that, in the image capturing element 10, other than pixels arranged in the light-receiving portion, a peripheral circuit for signal processing, an amplification circuit for a pixel signal, or the like are arranged.

A viewfinder optical system is configured by the pentagonal prism 4. Although not illustrated in FIG. 1, an object image reflected by the pentagonal prism 4 can be observed from an eyepiece. From the light beam that is reflected by the main mirror 3 and scattered by a focusing screen 12, some of the light beam that is outside of the optical axis is incident on the AE sensor 6. The interchangeable lens 2 performs information communication with the camera main body 1 as necessary, through a contact point of a lens mount provided on the camera main body 1. Note that, because the main mirror 3 is normally in a state of having sprung upward at a time of a live-view display and moving image recording, exposure control and focus adjustment control are performed by using image information of the image capturing surface.

Figure 2:
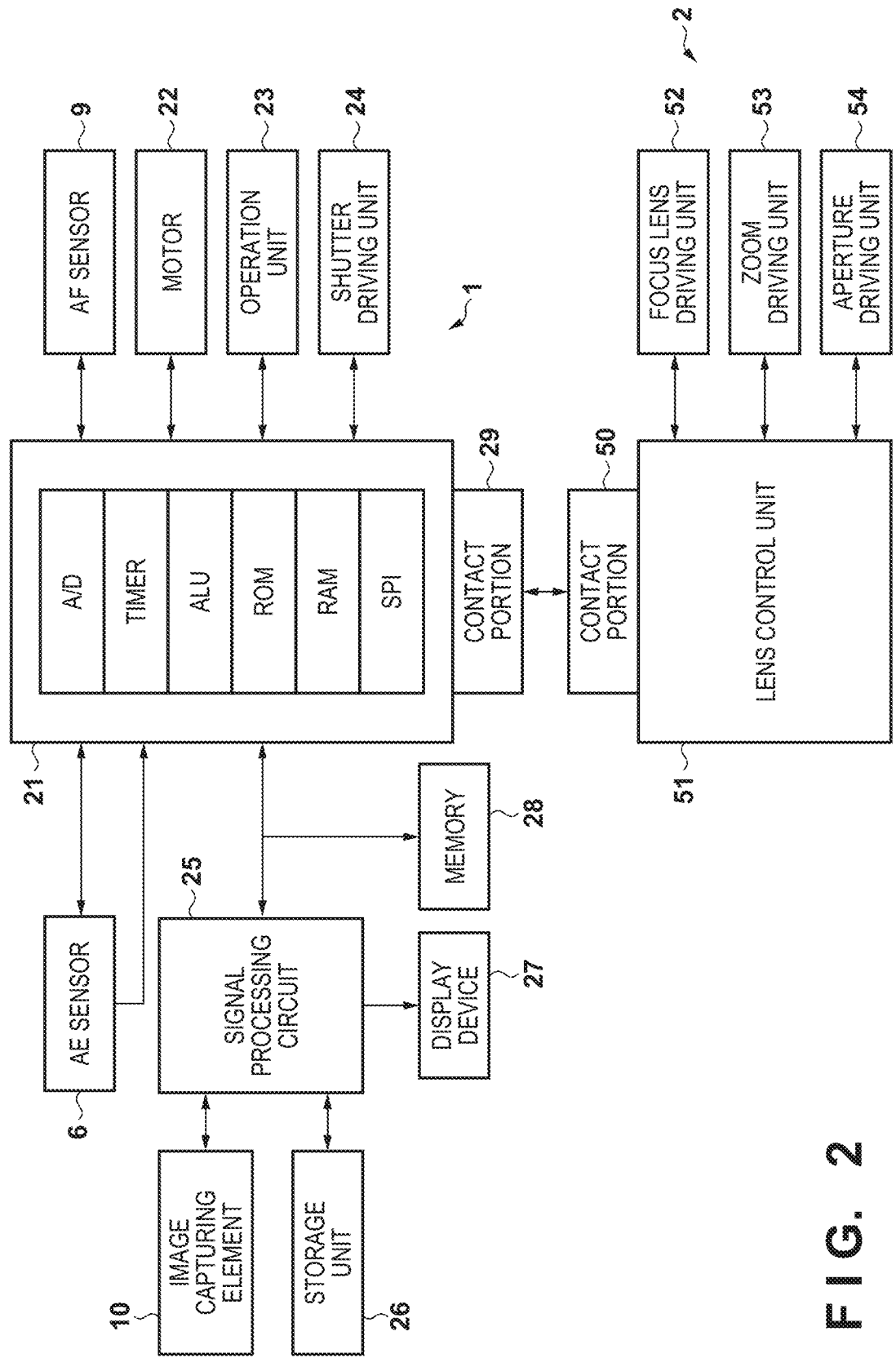
FIG. 2 is a block diagram that illustrates a configuration of an electrical circuit of a camera main body and an interchangeable lens.

FIG. 2 is a block diagram that illustrates a configuration of an electrical circuit of the camera main body 1 and the interchangeable lens 2 illustrated in FIG. 1. In the camera main body 1, a control unit 21 is a one-chip microcomputer that incorporates an ALU (Arithmetic and Logic Unit), a ROM, a RAM, an A/D converter, a timer, a serial communication port (SPI), or the like, for example. The control unit 21 controls operation of the camera main body 1 and the interchangeable lens 2 by executing a program stored in the ROM, for example. Detailed operation by the control unit 21 is described later.

Output signal from the focus detection sensor 9 and the light metering sensor 6 are connected to an A/D converter input terminal of the control unit 21. A signal processing circuit 25 controls the image capturing element 10 in accordance with an instruction by the control unit 21, and applies an A/D conversion and signal processing on a signal outputted by the image capturing element 10 to obtain an image signal. In addition, the signal processing circuit 25, when recording an obtained image signal, performs necessary image processing such as compression or compositing. A memory 28 is a DRAM or the like, is used as a work memory when the signal processing circuit 25 performs various signal processing, and is used as a VRAM when an image is displayed on a display device 27 which is described below. For the display device 27, a backlight liquid crystal display or a display apparatus connected as an external display by a standard such as HDMI (registered trademark) is envisioned, and the display device 27 displays a captured image or information such as camera setting values, a message, or a menu screen. The display device 27 is controlled by instructions from the control unit 21. A storage unit 26 is a nonvolatile memory such as a flash memory, for example, and a captured image signal is inputted to the storage unit 26 from the signal processing circuit 25.

A motor 22, in accordance with control by the control unit 21, makes the main mirror 3 and the first reflecting mirror 7 go up or down, and charges the mechanical shutter 11. An operation unit 23 is a group of input devices such as switches that a user uses to operate the camera. The operation unit 23 includes a release switch for a user to instruct a start of a capturing preparation operation and a start of image capturing, as well as an image capturing mode selection switch for selecting an image capturing mode, directional keys, a deciding key, and the like. A contact portion 29 is a contact point for performing communication with the interchangeable lens 2, and it is connected to an input/output signal from a serial communication port of the control unit 21. A shutter driving unit 24 is connected to an output terminal of the control unit 21, and drives the mechanical shutter 11.

A contact portion 50 that forms a pair with the contact portion 29 is provided on the interchangeable lens 2. A lens control unit 51 that is a one-chip microcomputer similar to the control unit 21 is connected to the contact portion 50, and it can communicate with the control unit 21. The lens control unit 51 controls operation of the interchangeable lens 2 by executing a program stored in a ROM, for example, based on an instruction from the control unit 21. In addition, information such as a state of the interchangeable lens 2 is notified to the control unit 21. A focus lens driving unit 52 is connected to an output terminal of the lens control unit 51, and the focus lens driving unit 52 drives a focus lens. A zoom driving unit 53 changes an angle of view of the interchangeable lens in accordance with control by the lens control unit 51. An aperture driving unit 54 adjusts an opening amount of an aperture in accordance with control by the lens control unit 51.

Data communication between the control unit 21 of the camera main body and the lens control unit 51 is possible via the contact portions 29 and 50 when the interchangeable lens 2 is attached to the camera main body 1. In addition, power for driving a motor or actuator in the interchangeable lens 2 is supplied through the contact portions 29 and 50. Optical information specific to a lens that the control unit 21 of the camera main body needs to perform focus detection or an exposure calculation, information relating to an object distance based on a distance encoder, or the like is outputted to the control unit 21 of the camera main body from the interchangeable lens 2 in accordance with data communication. In addition, aperture information or focus adjustment information obtained by the control unit 21 of the camera main body performing focus detection or an exposure calculation is outputted from the control unit 21 of the camera main body to the lens in accordance with data communication, and the interchangeable lens 2 controls the aperture or the focus lens in accordance with the aperture information or the focus adjustment information.

Figure 3:
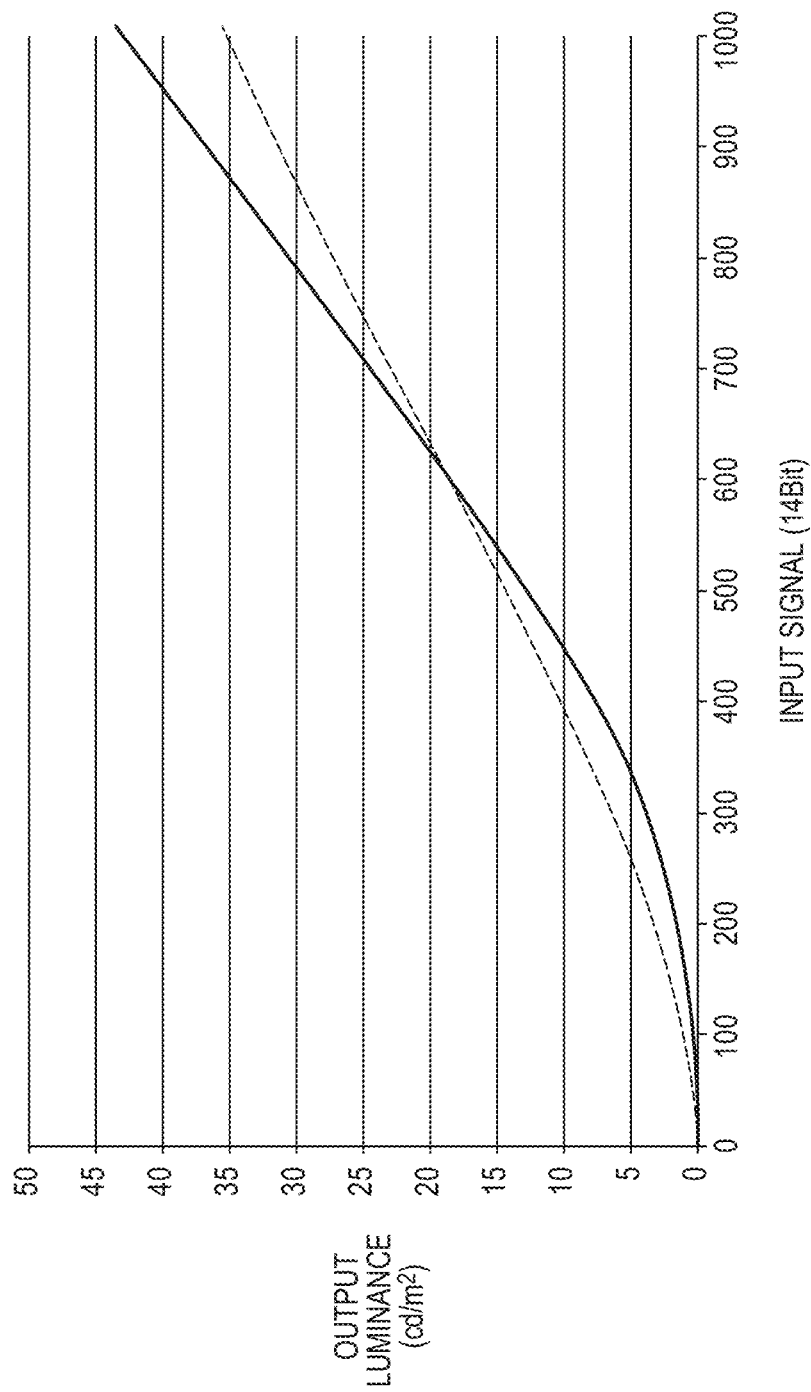
FIG. 3 is a view that illustrates a gamma curve for realizing conventional contrast enhancement.
Figure 4A:
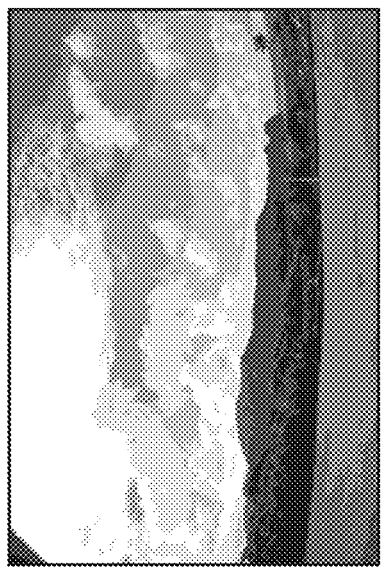
FIGS. 4A and 4B are views illustrating an original image and an image resulting from performing conventional contrast enhancement on the original image.

FIG. 3 is a view that illustrates an example of change in luminance when the contrast of an image is adjusted by a conventional method. In FIG. 3, luminance change adjustment amounts are roughly the same for a dark portion whose signal value is less than a point where the luminance does not change (hereinafter referred to as a midpoint) that is taken as a reference, and a bright portion whose signal value is higher than the reference. In addition, an example where an original image signal is displayed unchanged is given in FIG. 4A, and an example where an image signal after contrast enhancement is displayed is given in FIG. 4B, with each figure being an image of scenery. With respect to the original image, it is seen that, for the image after contrast enhancement, the contrast is enhanced, and in particular parts for shadows and mountains in dark portions are darkened. Meanwhile, parts for clouds that are a bright portion have not become much brighter, and it is not felt that the amount of change in luminance is the same for dark portions and bright portions. In other words, when an adjustment amount for luminance change for dark portions and bright portions is the same, the perceived amount of change for luminance for bright portions and dark portions is not the same. This is due to Weber's law. Weber's law states that a ratio of a differential threshold to a stimulus amount is always constant. The differential threshold indicates, when an amount of stimulus changes, the minimum amount of change that enables a change to be perceived. It is known that this the differential threshold increases as the stimulus amount increases. In other words, when the stimulus amount increases, the amount of change of sensory intensity decreases, and a characteristic as in FIG. 5 holds. Accordingly, in a contrast adjustment, an amount of change for a bright portion is made to be larger than an amount of change for a dark portion in order to have the amount of change for dark portions and bright portions be perceived as the same.

Figure 6:
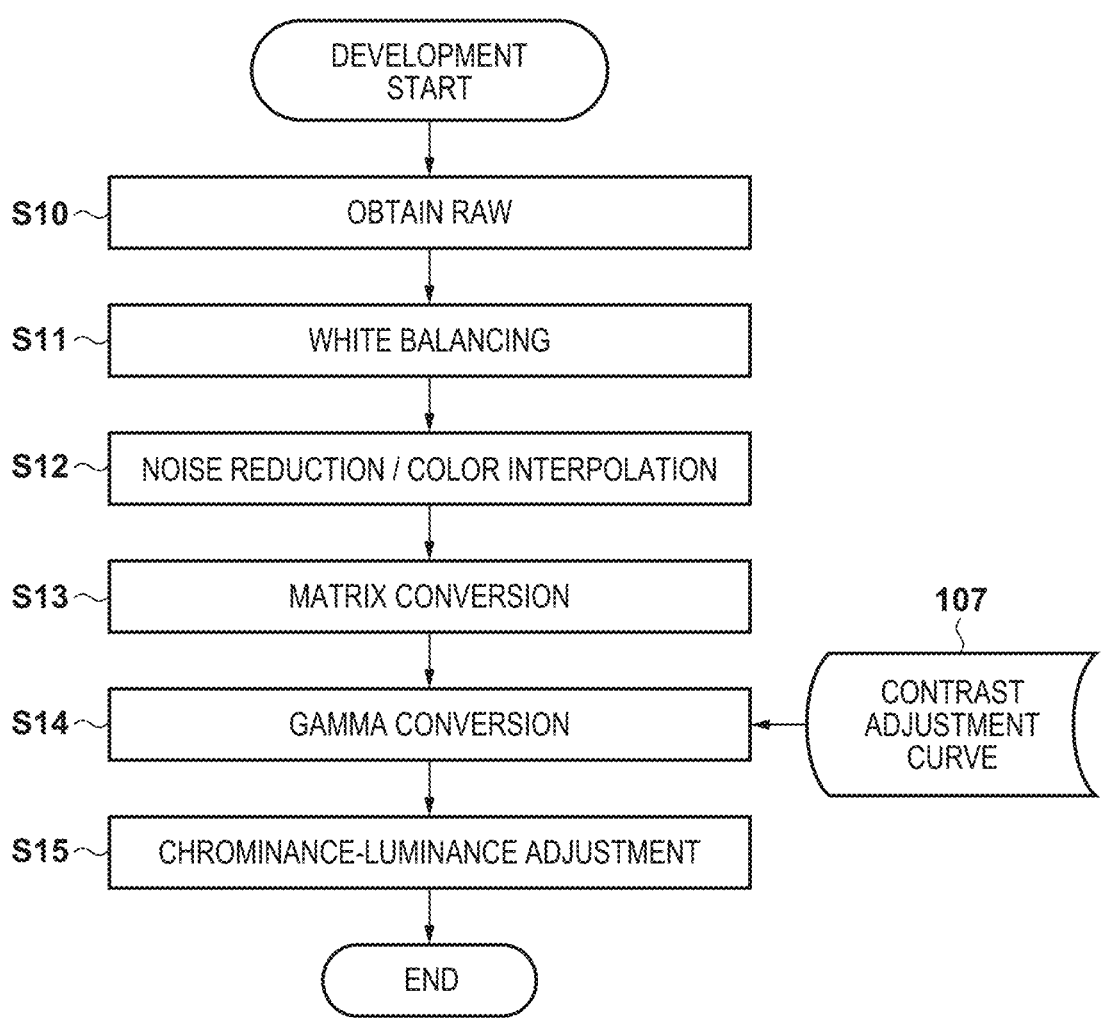
FIG. 6 is a flowchart that illustrates an operation for developing an image in the first embodiment.

FIG. 6 is a flowchart illustrating a flow of operations for performing development by adjusting the contrast, in the present embodiment. In addition, FIG. 7 is a view that illustrates a block configuration of a development processing unit inside the signal processing circuit 25.

In the present embodiment, when the control unit 21 becomes operable in accordance with, for example, a power supply switch included in the operation unit 23 of FIG. 2 being turned on, the following operations are performed before the operations of the flowchart of FIG. 6 are executed.

Firstly, the control unit 21 performs initialization processing such as communicating with the lens control unit 51 of the interchangeable lens 2, and obtaining information of various lenses needed for light metering or focus detection. Next, by a half-press operation of the shutter switch included in the operation unit 23, the start of operations for AF (auto focus) processing and AE (automatic exposure) processing is instructed. Subsequently, image capturing is performed by a full-press operation of the shutter switch. Subsequently, development of each piece of captured RAW image data is performed in accordance with the flowchart of FIG. 6.

Figure 7:
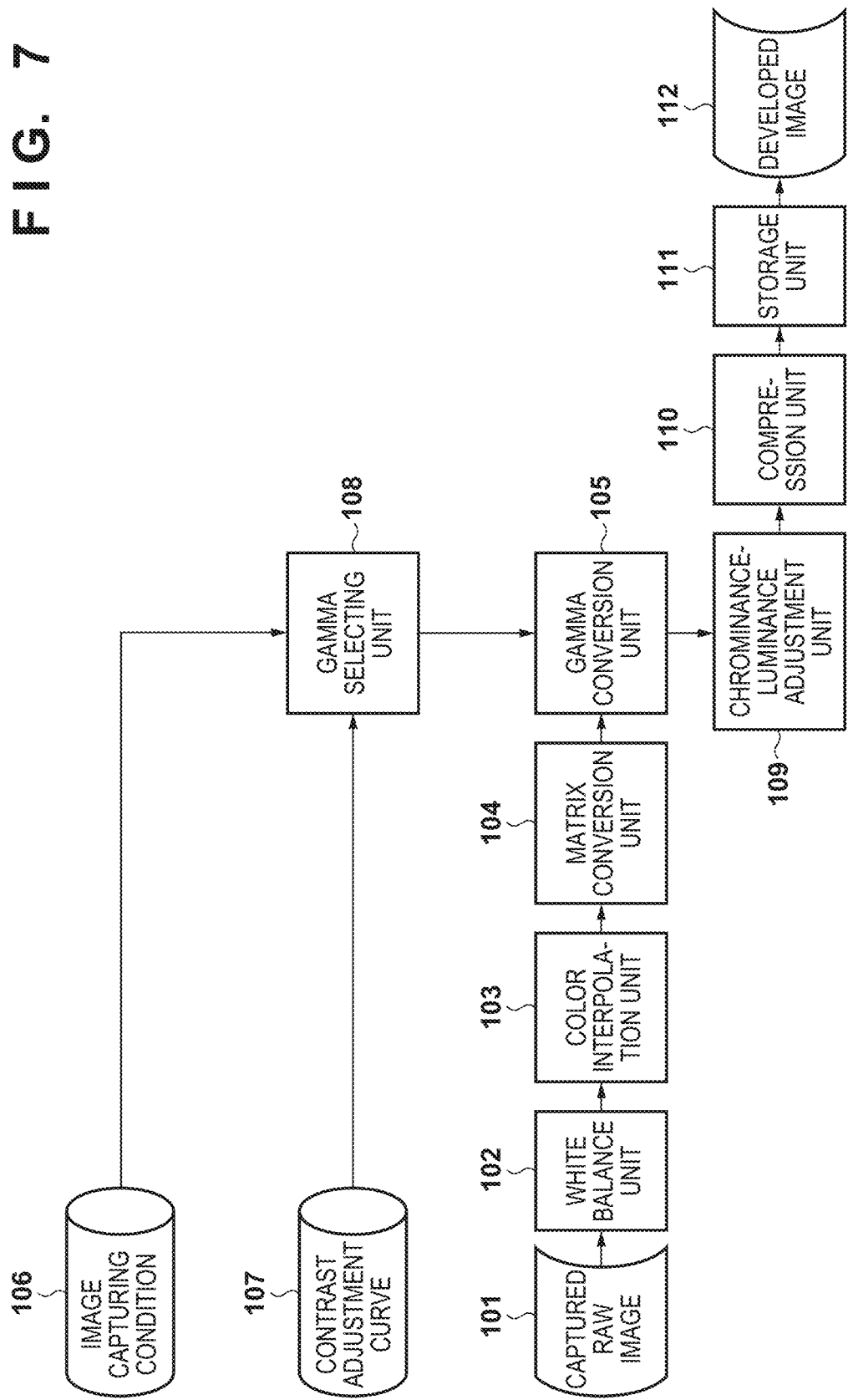
FIG. 7 is a view that illustrates a block configuration of a development processing unit inside a signal processing circuit in the first embodiment.

Details of the development processing is described here using FIG. 6 and FIG. 7. An object image passes through the interchangeable lens 2 and is formed on the image capturing element 10 which photo-electrically converts the object image. Assume that the image capturing element 10 is a single-plane color image capturing element provided with a typical primary color filter, for example. The primary color filter comprises three types of color filters having primary transmission wavelength bands near 650 nm, 550 nm, and 450 nm, respectively, and captures color planes respectively corresponding to bands for R (red), G (green), and B (blue). With a single-plane color image capturing element, a color filter is spatially arranged for each pixel, and each pixel can only obtain a light intensity at a single respective color plane. Accordingly, a RAW image 101 which is a color mosaic image is outputted from the image capturing element (FIG. 6: step S10). In a white balance unit 102, processing is performed so that an object which is in fact white appears white (FIG. 6: step S1). Specifically, RGB data of each pixel that configures the captured image data is plotted in a predetermined color space such as an xy color space, for example. As a result, R, G, and B for data plotted near a black body radiation locus which is highly likely to be a light-source color for the color space are integrated, and, from the integrated values, white balance coefficients G/R and G/B are obtained for R and B components. White balance coefficients generated in accordance with such processing are used to perform white balance processing.

In a color interpolation unit 103, in accordance with noise reduction processing or processing for interpolating a color mosaic image, a color image for which pieces of R, G, and B color information are aligned in all pixels is generated (FIG. 6: step S12). The generated color image passes through a matrix conversion unit 104 and a gamma conversion unit 105 so that a basic color image is generated (FIG. 6: step S13 and step S14). Subsequently, processing for improving the appearance of the image is performed by a chrominance-luminance adjustment unit 109 on the color image (FIG. 6: step S15); for example, image correction is performed in accordance with the scene, such as detecting a night scene and performing chroma enhancement. When the chrominance-luminance adjustment ends, the development processing completes, and a developed image 112 is generated.

Figure 8:
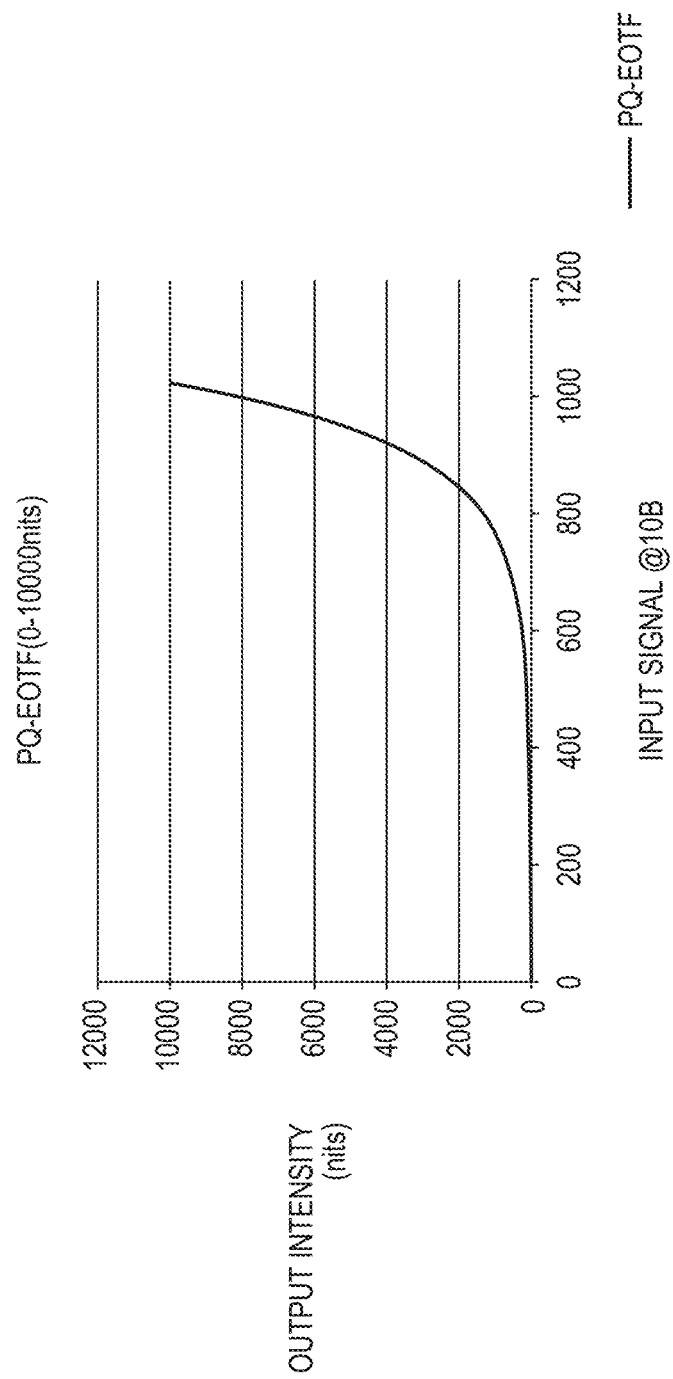
FIG. 8 is a view that illustrates EOTF characteristics of PQ (Perceptual Quantization) which is standardized by SMPTE ST 2084.

Here, HDR (high dynamic range) development is envisioned for the gamma conversion unit 105. Its gamma characteristic (tone conversion curve) is a reverse characteristic of an HLG (Hybrid Log Gamma) EOTF (Electro-Optical Transfer Function) developed in ARIB STD-B67, or PQ (Perceptual Quantization) illustrated in FIG. 8 which is standardized by SMPTE ST 2084, for example.

Next, description is given regarding a method of generating a contrast adjustment curve that has the equivalent perceived amounts of change for dark portions and bright portions. A visual differential threshold is used to make the perceived amounts of change for dark portions and bright portions be equivalent. In psychophysics, a differential threshold (amount of change that can be perceived in the present embodiment), is also referred to as a just-noticeable difference (JND). A differential threshold is referred to as a JND below. Several methods can be considered for how to obtain a JND, but, in the present embodiment, a method, referred to as a Barten model, for calculating a JND from a visual contrast sensitivity that is used. A visual contrast sensitivity in accordance with a Barten model is modeled in accordance with Equation (1) indicated below.

$$S(L, u) = \frac{1}{m_t} = \frac{M_{opt}(u)/k}{\sqrt{\frac{2}{T}\left(\frac{1}{X_0^2} + \frac{1}{X_{max}^2} + \frac{u^2}{N_{max}^2}\right)\left(\frac{1}{\eta p E} + \frac{\Phi_0}{1 - e^{-(u/u_0)^2}}\right)}} \quad (1)$$

$$M_{opt}(u) = e^{-2\pi^2 \sigma^2 u^2}$$

$$\sigma = \sqrt{\sigma_0^2 + (C_{ab}d)^2}$$

$$d = 5 - 3\tanh(0.4\log((LX_0^2/40^2)))$$

$$E = \frac{\pi d^2}{4} L(1 - (d/9.7)^2 + (4/12.4)^4)$$

Figure 9:
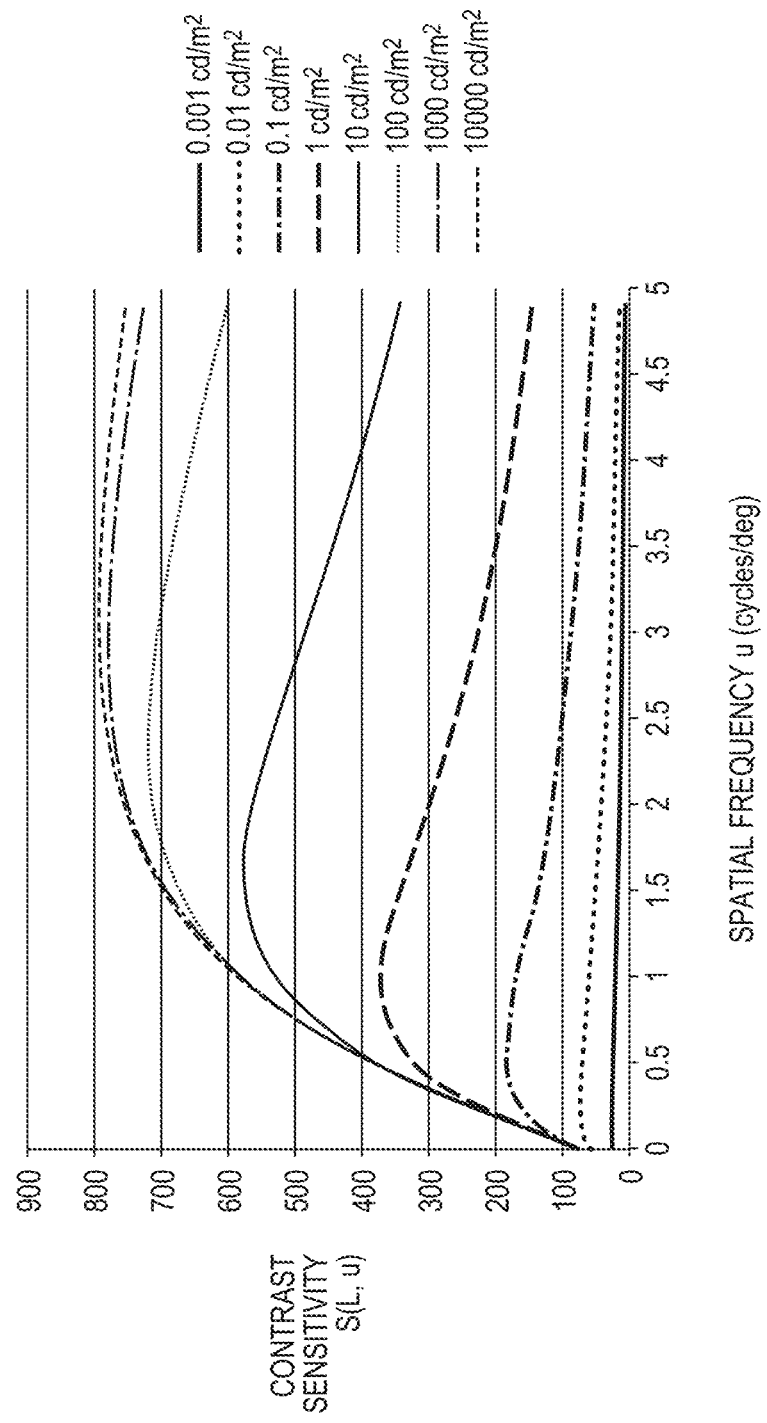
FIG. 9 is a view that illustrates visual contrast sensitivity characteristics in accordance with a Barten model.
Figure 10:
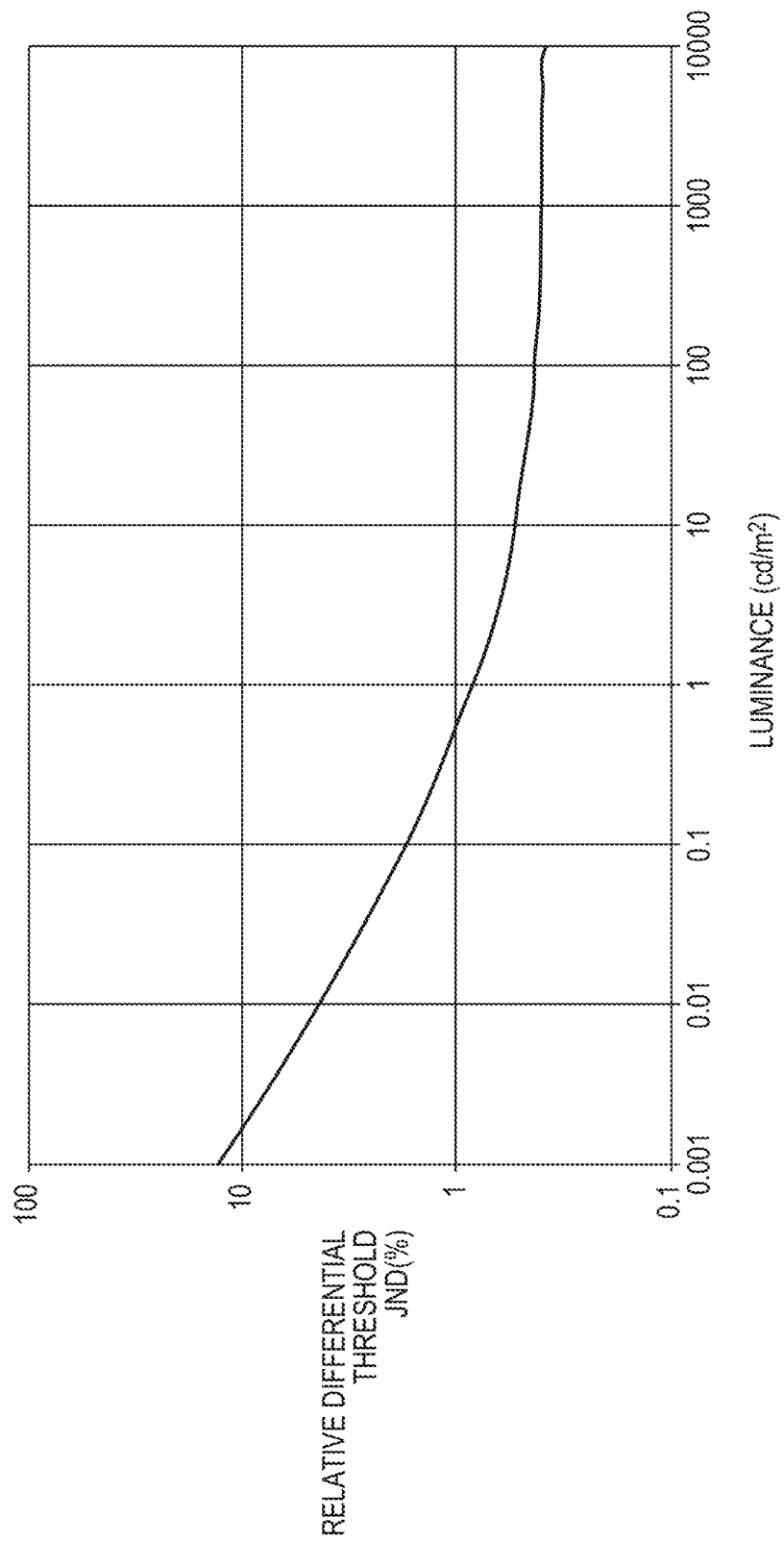
FIG. 10 is a view that illustrates a characteristic for a relative differential threshold (JND) at each luminance value.

However,
k=3.0
$\sigma_0$=0.5 arc min
$C_{ab}$=0.08 arc min/mm
T=0.1 sec
$X_{max}$=12°
$N_{max}$=15 cycles
η=0.03
$\Phi_0$=3×10$^{-8}$ sec deg$^2$
$u_0$=7 cycles/deg p=1.2×10$^6$ photons/sec/deg$^2$/Td In Equation (1), as illustrated by FIG. 9 a visual contrast sensitivity S(L, u) is calculated for each luminance value and spatial frequency. In such a case, it is possible to calculate a relative differential threshold JND at any luminance value, as illustrated in FIG. 10, by using the spatial frequency for the highest contrast sensitivity to calculate a reciprocal for the contrast sensitivity at that point. An absolute differential threshold may be calculated from a relative differential threshold by multiplying the ordinate by the luminance. The differential threshold of absolute luminance has a characteristic of increasing the higher the luminance is.

Figure 11:
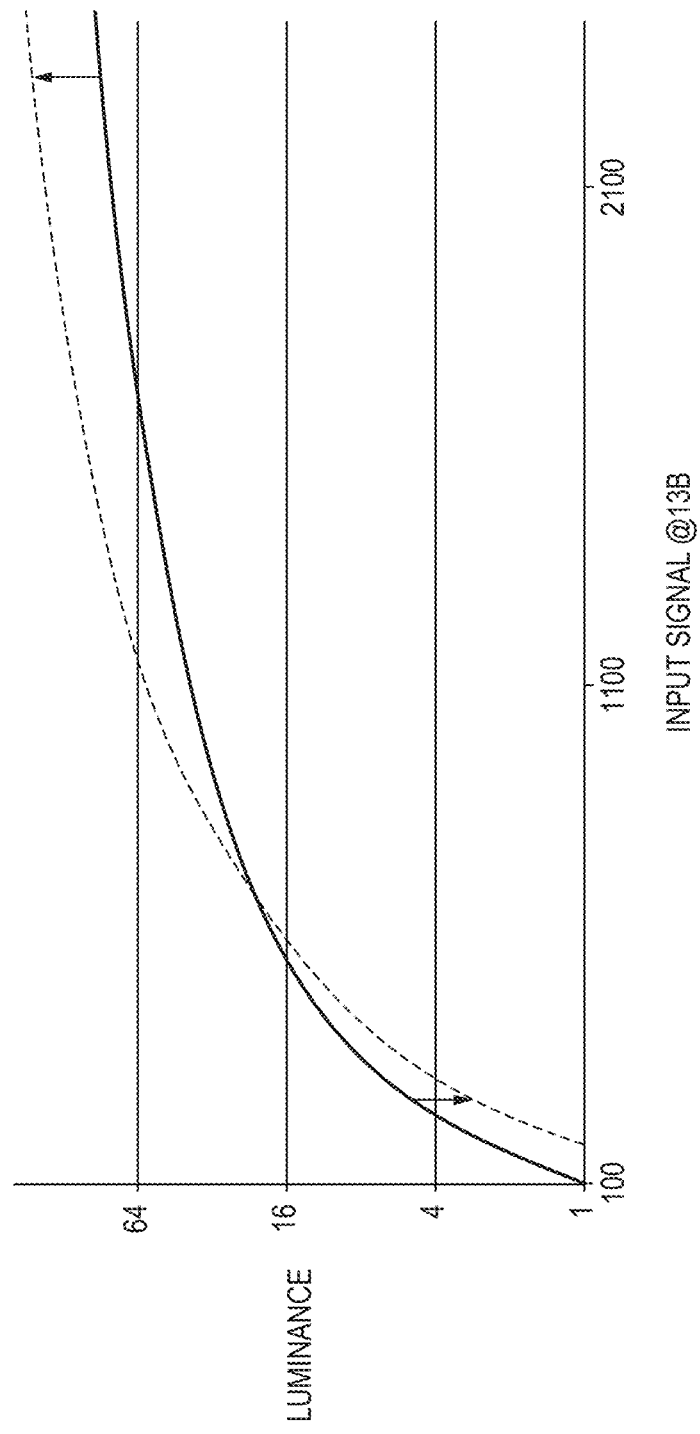
FIG. 11 is a view that illustrates a gamma curve for realizing contrast enhancement that considers a JND.

Illustration is given in FIG. 11 of an example of obtaining a luminance change amount where the same amount of perceived change is felt for a dark portion and a bright portion in a contrast adjustment that uses the JND calculated as described above. The solid line indicates the original signal, and the dashed line indicates the signal after contrast adjustment. The point of intersection of the two lines is a point where there is proper exposure, is a point where there is no fluctuation in the contrast adjustment, and is roughly 18 cd/m$^2$. An example of enhancing contrast is illustrated in this graph, and, for example, the downward arrow indicates a signal level adjustment on the input signal of −2 stops from proper exposure, and the upward arrow indicates a signal level adjustment on the input signal of +2 stops from proper exposure. In a case of making a signal at −2 stops go one more stop under, the specific luminance goes from 4.5 cd/m$^2$ to 2.25 cd/m$^2$, with a difference of 2.25 cd/m$^2$. Here, when making the signal at +2 stops go one more stop over, rather than becoming 74.25 cd/m$^2$ which results from adding 2.25 cd/m$^2$ to 72 cd/m$^2$, the specific luminance becomes 103 cd/m$^2$ when the JND is considered. By this, it is possible to make the amount of change be perceptively the same for a dark portion and a bright portion. This means that the number of tones of a luminance change when the JND is set to one perceived tone in a bright portion is the same as the number of tones of a luminance change amount when the JND is set to one perceived tone in a dark portion. By having such a luminance change amount, it is possible to have the perceived luminance change amount be the same for a dark portion and a bright portion.

Figure 12:
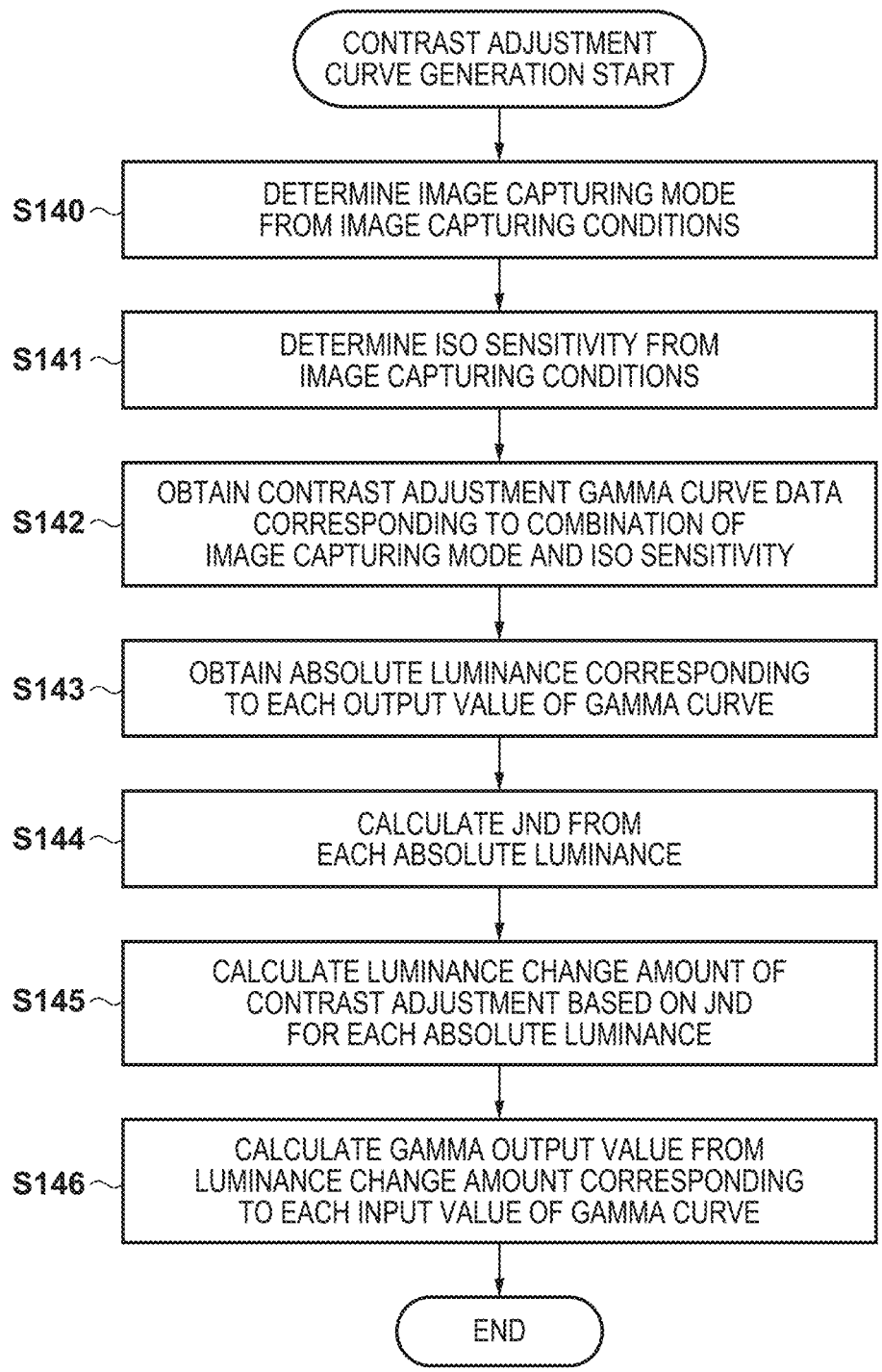
FIG. 12 is a flowchart illustrating an operation for generating a contrast adjustment curve in the first embodiment.

Next, a flowchart that illustrates an operation for generating a contrast adjustment curve 107 (refer to FIG. 6, and FIG. 7) is illustrated in FIG. 12. Firstly, an image capturing mode is determined from an image capturing condition (step S140). A conventional digital camera has a normal AE mode and a high luminance priority mode which comprises AE that captures at one stop under, and a user selects with which mode to capture by in accordance with a scene. To have the brightness of a proper exposure after development be the same regardless of the mode, a gamma characteristic is assigned so as to cause the signal level after proper exposure of an input signal to be shifted to a signal that is one stop lower in the high luminance priority mode, in comparison to the normal image capturing mode. By this, even if the saturation level of the image capturing element is the same in both image capturing modes, a difference of one stop occurs in the dynamic range, particularly in the highlights. When this difference is subject to HDR development, because it will be the difference of peak luminance, it is necessary to consider this portion even in the calculation of the JND.

Subsequently, there are cases where the dynamic range differs similarly in accordance with the ISO sensitivity. With respect to reference ISO sensitivity of 100 for which gain in accordance with an amplifier is not applied in the image capturing element, high sensitivity ISO of 200 or more for which analog gain or digital gain is applied has a lower charge amount with respect to the capacity of a photodiode, and the dynamic range is larger. For an intermediate ISO sensitivity with an increment of ⅓ of a stop, in an image capturing element that only has a low cost amplifier for which gain increments are only 1 stop, the intermediate ISO sensitivity is realized by increasing or decreasing the gain from a representative ISO sensitivity. In such a case, the saturated signal level decreases with the lowered gain, and the dynamic range decreases. In this way, there is a need to consider the image capturing conditions, in particular the peak luminance which differs in accordance with ISO sensitivity, when calculating JND (step S141). Consequently, a number of gamma curves for a number of combinations of image capturing mode and ISO sensitivity are prepared in advance and stored in the memory 28 as the contrast adjustment curve 107. With reference to the image capturing condition (image capturing mode and ISO sensitivity) 106, the contrast adjustment curve 107 corresponding to the combination of image capturing mode and ISO sensitivity is read from the memory 28 by a gamma selecting unit 108 (step S142).

Absolute luminance corresponding to each output value of a gamma curve is obtained from obtained contrast adjustment gamma curve data (step S143). Calculation of an absolute luminance value may be performed by using an EOTF (Electro-Optical Transfer Function) of an HLG (Hybrid Log Gamma) developed by ARIB STD-B67 or PQ (Perceptual Quantization) illustrated in FIG. 8 which is standardized by SMPTE ST 2084.

Subsequently, the JND is calculated from the visual contrast sensitivity referred to as the Barten model previously described (step S144). A luminance change amount of a contrast adjustment is calculated based on the obtained JND (step S145). Finally, gamma output values are calculated from luminance change amounts corresponding to each input value of the gamma curve (step S146). This conversion can use an OETF (Optical-Electro Transfer Function) which is an inverse characteristic of PQ (Perceptual Quantization) standardized by SMPTE ST 2084.

Figure 4B:
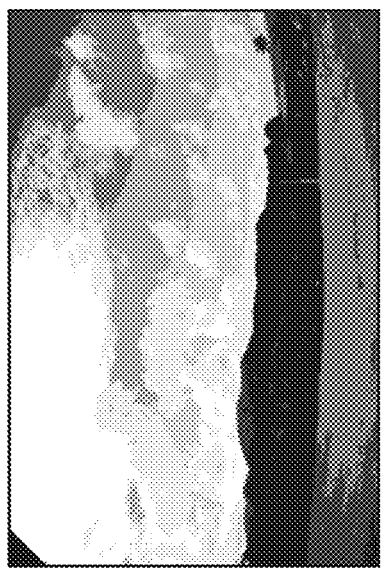
Figure 5:
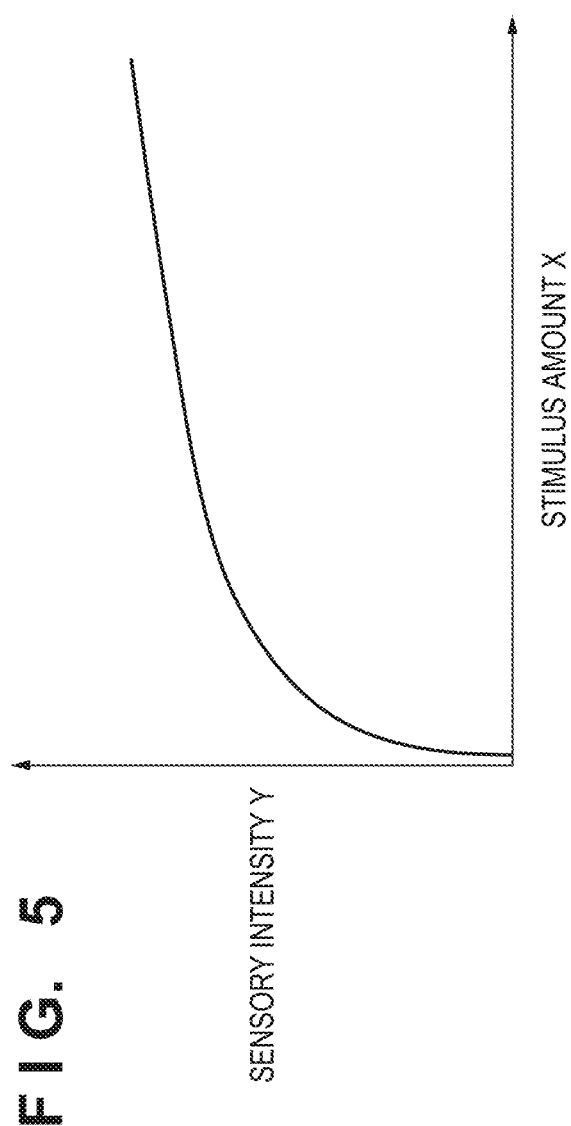
FIG. 5 is a view that illustrates a relationship between a stimulus amount and sensory intensity.
Figure 13:
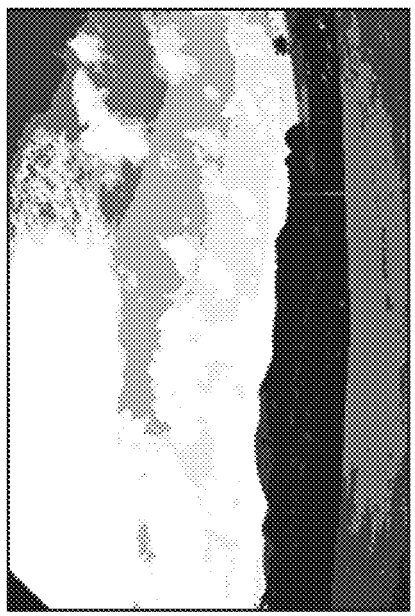
FIG. 13 is a view for illustrating an image resulting from performing contrast enhancement that considers the JND on an original image.

By using an updated contrast adjustment gamma curve to perform a contrast adjustment, a scene as in FIG. 4B, for which the same luminance change could not be perceived for a dark portion and a bright portion conventionally, can be perceived as the same luminance change as illustrated by FIG. 13.

As described above, by virtue of the first embodiment, it is possible to perform a contrast adjustment for which luminance change amounts for a dark portion and a bright portion are perceived as the same, even with a high luminance image such as HDR, by using a gamma curve generated based on a visual differential threshold JND.

(Second Embodiment)

Next, a second embodiment of the present invention is described. In the first embodiment, description was given regarding a method for performing a contrast adjustment that uses a contrast adjustment gamma curve prepared in advance by considering a JND decided in accordance with the dynamic range of an input image based on an image capturing condition. In contrast to this, the second embodiment differs to the first embodiment by performing a contrast adjustment by dynamically generating a contrast adjustment gamma curve by considering a JND that is decided in accordance with a dynamic range of an input image that depends on the characteristics of a scene or an object.

Figure 14:
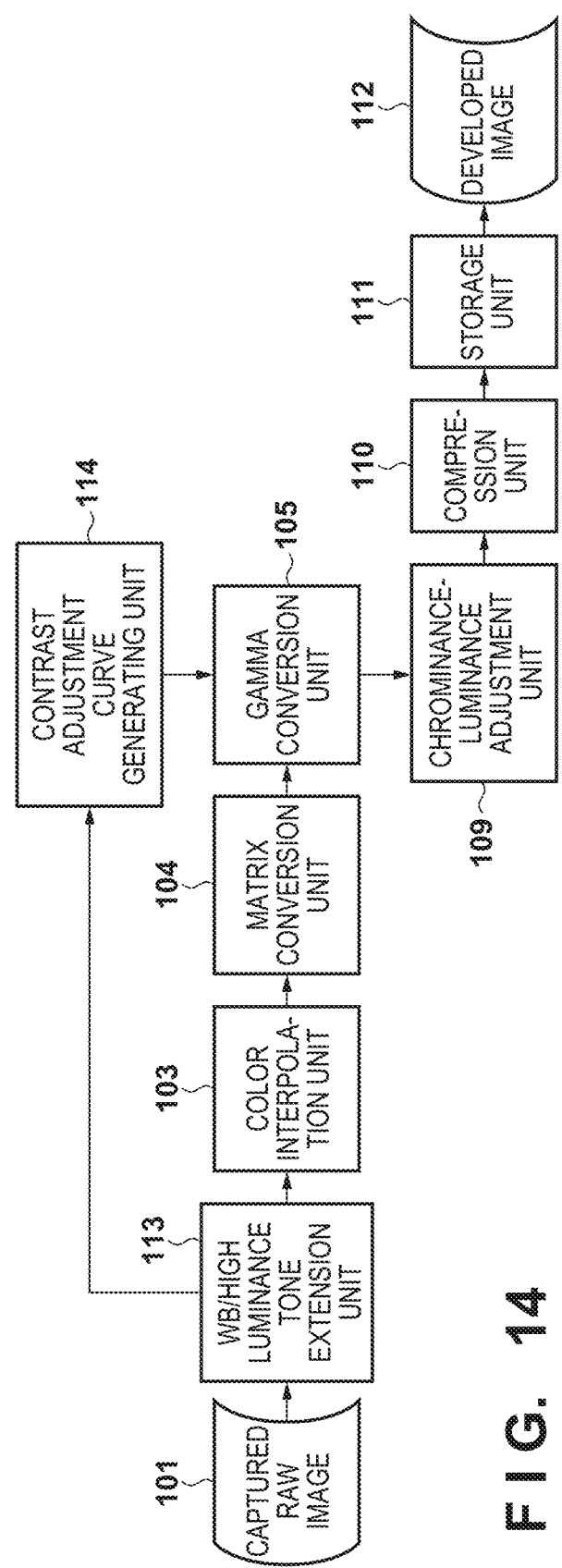
FIG. 14 is a view that illustrates a block configuration of a development processing unit inside a signal processing circuit in a second embodiment.

FIG. 14 is a view that illustrates a block configuration of a development processing unit inside the signal processing circuit 25 in a second embodiment. How the configuration of FIG. 14 differs from the first embodiment is that white balance coefficients calculated in a white balance unit 113 of FIG. 14 are used to decide the dynamic range of an input image, and, based on this, a gamma curve is generated by a contrast adjustment curve generating unit 114. In addition, portions in common with FIG. 7 have the same reference numeral added thereto, and description thereof is omitted.

Description is given here regarding a principle where the dynamic range of an input changes in accordance with white balance processing. White balancing is, as described above, processing for making an object that is in fact white appear white, and is processing that applies a predetermined gain (a white balance coefficient) to R and B, with G as a reference (no scaling). In this case, in a signal for a region where pixels of the image capturing element 10 are saturated, the signal levels of the R, G, and B channels are aligned at a stage before white balance processing is performed. By applying a white balance gain, the signal levels of the R, G. and B channels will be inconsistent all the more. Specifically, because the R and B signals other than G basically increase, magenta-colored coloring occurs for the color, and this is a cause of image quality degradation. Accordingly, typically the coloring is suppressed by applying a limiter at the saturation level for G. In contrast, by performing limiter processing, tone is lost for R and B signals. Accordingly, it is possible to extend high luminance tones by using the R and B signals for which tone remain to perform replacement processing for the G signal to estimate tones, without performing limiter processing. Several methods for high luminance tone extension may be considered, but, for example, by using the method recited in Japanese Patent Laid-Open No. 2015-156616, high luminance tones are extended, and the dynamic range of an input image is caused to increase. The amount that the dynamic range is caused to increase depends on the white balance coefficient, and in other words depends on the scene or the object.

Figure 15:
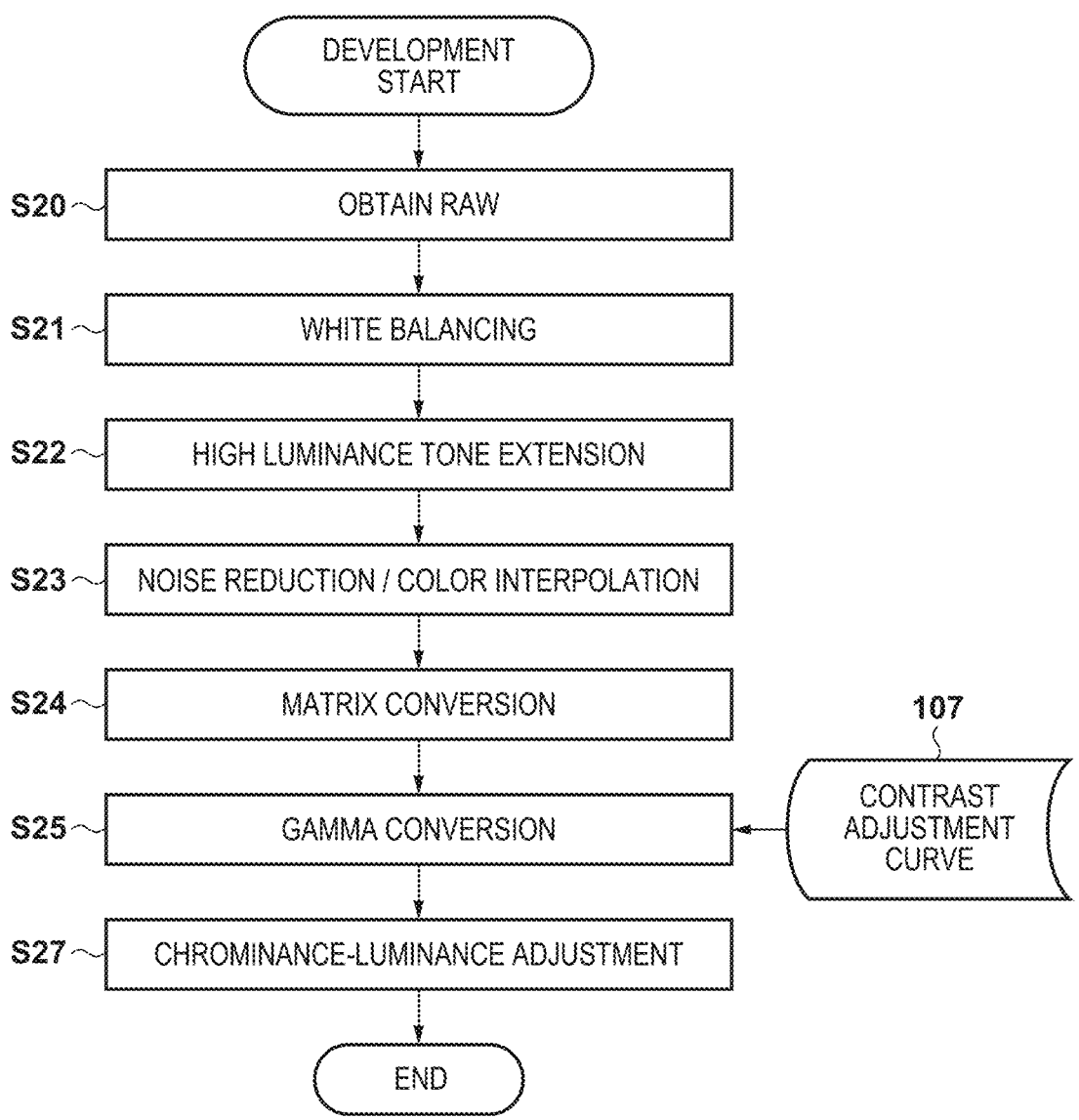
FIG. 15 is a flowchart that illustrates an operation for developing an image in the second embodiment.
Figure 16:
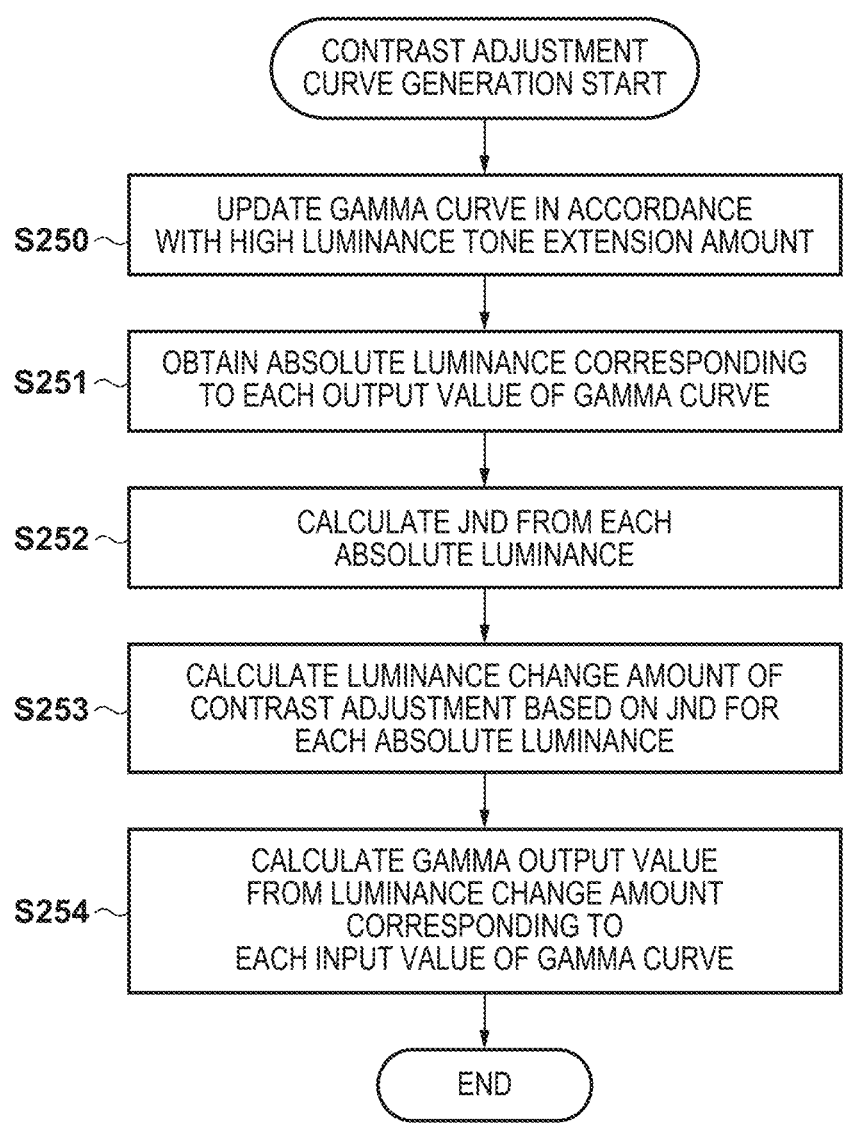
FIG. 16 is a flowchart that illustrates an operation for generating a contrast adjustment curve in the second embodiment.

FIG. 15 is a flowchart that illustrates operations for development processing of the second embodiment. It differs from the flowchart of the first embodiment which is illustrated by FIG. 6, and a step for high luminance tone extension described above (step S22) is added. Other steps are the same as in FIG. 6. In addition, FIG. 16 is a flowchart illustrating operations for generating a contrast adjustment curve 25. Differing from the flowchart of the first embodiment illustrated in FIG. 12, a step for updating the gamma curve in accordance with a high luminance tone extension amount (step S250) is added. In the contrast adjustment curve generating unit 114 of FIG. 14, the contrast adjustment curve 25 is dynamically generated. Note that the operations of step S251 through step S254 of FIG. 16 are the same as the operations of step S143 through step S145 of the first embodiment that are indicated in FIG. 12, and thus description thereof is omitted.

Here, as the method of calculating the JND, in the first embodiment, the method for calculating the JND from the visual contrast sensitivity referred to as the Barten model is used. However, the method for calculating the JND is not limited to this, and, for example, description is given in the second embodiment regarding an example of calculating it from a model referred to as Weber's law.

In the model referred to as Weber's law, the JND with respect to a luminance value Y is obtained by a ratio thereof, and is modeled by Equation (2).

$$\Delta Y/Y = \text{constant} \qquad (2)$$

In Equation (2), but setting an appropriate value to the constant, it is possible to calculate the JND with respect to the luminance value Y. A gamma conversion is performed by the gamma conversion unit 105 using a contrast adjustment curve decided by the method described above (step S25).

By virtue of the second embodiment described above, the gamma curve, which is based on a visual differential threshold JND, is dynamically generated in accordance with an object. By this, even with an image having high luminance as with HDR, it is possible to perform a contrast adjustment that is suitable for a scene, so that the luminance change amounts for a dark portion and a bright portion are perceived as the same.

Explanation is thus given for advantageous embodiments of the present invention, but the present invention is not limited to these embodiments, and various variations and changes are possible within the scope of the spirit of the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-197060, filed Oct. 10, 2017, which is hereby incorporated by reference herein in its entirety.

What is claimed is:

1. An image processing apparatus operable to perform development processing by performing at least a tone conversion on RAW image data that is inputted image data, the apparatus comprising:
   at least one process or and/or circuit configured to function as following units,
   a setting unit configured to set a first tone conversion curve corresponding to a dynamic range of the image data;
   an adjusting unit configured to generate a second tone conversion curve by adjusting the first tone conversion curve so that luminance change degree of a bright portion that has brightness higher than predetermined brightness and is included in the image data becomes visually equivalent to luminance change degree of a dark portion that has brightness lower than the predetermined brightness and is included in the image data; and
   a tune conversion unit configured to perform a tone conversion of the image data by using the second tone conversion curve.

2. The image processing apparatus according to claim 1, wherein the setting unit sets the first tone conversion curve by determining the dynamic range based on an image capturing condition with which the image data was captured.

3. The image processing apparatus according to claim 2, wherein the image capturing condition is a condition of which image capturing mode, out of at least two image capturing modes having different dynamic ranges, the image data was captured with.

4. The image processing apparatus according to claim 2, wherein the image capturing condition is a condition of an ISO sensitivity with which the image data was captured.

5. The image processing apparatus according to claim 2, wherein the image capturing condition is a condition of a white balance coefficient with which white balance processing was performed on the image data.

6. The image processing apparatus according to claim 5, wherein the at least one processor and/or circuit is configured to further function as an extension unit configured to extend high luminance tones of the image data, based on the white balance coefficient.

7. The image processing apparatus according to claim 2, wherein the setting unit selects the first tone conversion curve from a plurality of tone conversion curves prepared in accordance with combinations of image capturing conditions with which the image data was captured.

8. The image processing apparatus according to claim 1, wherein the at least one processor and/or circuit is configured to further function as following units:
   an obtaining unit configured to obtain an absolute luminance value corresponding to an output value of the first tone conversion curve; and
   a calculating unit configured to, based on the absolute luminance value, calculate a differential threshold that is a perceivable luminance change amount corresponding to the absolute luminance value,
   wherein the adjusting unit adjusts the contrast of the image data by adjusting the first tone conversion curve so that, based on the differential threshold,
   the luminance change degree of the bright portion of the image data and the luminance change degree of the dark portion of the image data are visually equivalent.

9. The image processing apparatus according to claim 8, wherein the adjusting unit adjusts the first tone conversion curve so that a number of tones an adjustment amount of the tone conversion curve when the differential threshold in the bright portion of the image data is set as one tone is equivalent to a number of tones of the adjustment amount of the tone conversion curve when the differential threshold in the dark portion of the image data is set to one tone.

10. The image processing apparatus according to claim 8, wherein the calculating unit calculates the differential threshold based on a Barten model or Weber's law.

11. An image processing method for performing development processing by performing at least a tone conversion on RAW image data that is inputted image data, the method comprising:
- setting a first tone conversion curve corresponding to a dynamic range of the image data;
- generating a second tone conversion curve by adjusting the first tone conversion curve so that luminance change degree of a bright portion that has brightness higher than predetermined brightness and is included in the image data becomes visually equivalent to luminance change degree of a dark Portion that has brightness lower than the predetermined brightness and is included in the image data; and
- performing a tone conversion of the image data by using the second tone conversion curve.

12. A non-transitory computer-readable storage medium storing a program for causing a computer to execute each step of an image processing method for performing development processing by performing at least a tone conversion on RAW image data that is inputted image data, the method comprising:
- setting a first tone conversion curve corresponding to a dynamic range of the image data;
- generating a second tone conversion curve by adjusting the first tone conversion curve so that luminance change degree of a bright portion that has brightness higher than predetermined brightness and is included in the image data becomes visually equivalent to luminance change degree of a dark portion that has brightness lower than the predetermined brightness and is included in the image data; and
- performing a tone conversion of the image data by using the second tone conversion curve.

* * * * *